(12) United States Patent
Rampersad

(10) Patent No.: US 11,790,770 B2
(45) Date of Patent: Oct. 17, 2023

(54) ILLUMINATION SYSTEM FOR CROSSING ZONE

(71) Applicant: On It Solutions, LLC, Grand Rapids, MI (US)

(72) Inventor: Laura Louise Rampersad, Grand Rapids, MI (US)

(73) Assignee: On It Solutions, LLC, Grand Rapids, MI (US)

(*) Notice: Subject to any disclaimer, the term of this patent is extended or adjusted under 35 U.S.C. 154(b) by 0 days.

(21) Appl. No.: 17/366,328

(22) Filed: Jul. 2, 2021

(65) Prior Publication Data

US 2022/0005346 A1    Jan. 6, 2022

Related U.S. Application Data

(60) Provisional application No. 63/047,288, filed on Jul. 2, 2020.

(51) Int. Cl.
*G08G 1/005*     (2006.01)
*F21V 23/00*    (2015.01)
(Continued)

(52) U.S. Cl.
CPC ........... *G08G 1/005* (2013.01); *F21V 21/008* (2013.01); *F21V 23/003* (2013.01); *F21V 23/0442* (2013.01); *F21V 23/0464* (2013.01); *G08G 1/095* (2013.01); *H05B 47/11* (2020.01); *H05B 47/115* (2020.01); *H05B 47/165* (2020.01);
(Continued)

(58) Field of Classification Search
CPC ...... G08G 1/005; G08G 1/095; F21V 23/003; F21V 23/0442; F21V 21/008; F21V 23/0464; F21W 2131/103; H05B 47/11; H05B 47/115; H05B 47/165; H05B 47/19; F21Y 2105/16; F21Y 2115/10; Y02B 20/40

See application file for complete search history.

(56) References Cited

U.S. PATENT DOCUMENTS

2012/0143383 A1* 6/2012 Cooperrider ......... H05B 47/175
                                                                  700/295
2016/0286629 A1* 9/2016 Chen ...................... H05B 47/19
(Continued)

FOREIGN PATENT DOCUMENTS

AU    2013101353 A4 * 11/2013
CN    103931172 A   *  7/2014   ............. G01N 21/17
(Continued)

OTHER PUBLICATIONS

Yamazoe Kensuke et al., "Illumination System", Nov. 15, 2012, JP 2012226993 A, pp. 1/16-6/16 for English text and 15/16 for Figures 1-5. (Year: 2012).*
(Continued)

*Primary Examiner* — Alan B Cariaso
(74) *Attorney, Agent, or Firm* — McGarry Bair PC

(57) ABSTRACT

Pedestrian crossing zones at an intersection are often poorly illuminated. Lighting systems typically only partially illuminate the pedestrian crossing zone or provide only diffuse light. Herein is disclosed a crossing zone illumination system and method of operation, comprising a controller and an array of at least two lights coupled to a span wire above each pedestrian crossing zone.

20 Claims, 8 Drawing Sheets

(51) Int. Cl.
  *F21V 23/04*     (2006.01)
  *F21V 21/008*    (2006.01)
  *G08G 1/095*     (2006.01)
  *H05B 47/115*    (2020.01)
  *H05B 47/165*    (2020.01)
  *H05B 47/11*     (2020.01)
  *H05B 47/19*     (2020.01)
  *F21Y 115/10*    (2016.01)
  *F21W 131/103*   (2006.01)
  *F21Y 105/16*    (2016.01)

(52) U.S. Cl.
  CPC ....... *H05B 47/19* (2020.01); *F21W 2131/103* (2013.01); *F21Y 2105/16* (2016.08); *F21Y 2115/10* (2016.08); *Y02B 20/40* (2013.01)

(56) References Cited

U.S. PATENT DOCUMENTS

| | | | |
|---|---|---|---|
| 2019/0197883 A1* | 6/2019 | Camras | G08G 1/162 |
| 2020/0074846 A1 | 3/2020 | York | |
| 2020/0363043 A1* | 11/2020 | Stegeman | F21V 21/116 |
| 2022/0189308 A1* | 6/2022 | Stent | G08G 1/005 |

FOREIGN PATENT DOCUMENTS

| | | | | |
|---|---|---|---|---|
| KR | 200276206 Y1 * | 5/2002 | | F21V 21/008 |
| KR | 20040110782 A | 12/2004 | | |
| KR | 101117071 B1 * | 2/2012 | | G08G 1/005 |
| KR | 20120050009 A * | 5/2012 | | |
| KR | 20140022324 A | 2/2014 | | |
| KR | 101590420 B1 * | 2/2016 | | |
| KR | 101590420 B1 | 2/2016 | | |
| KR | 20180001731 A * | 5/2018 | | G08G 1/005 |
| KR | 102099463 B1 * | 4/2020 | | G08G 1/005 |
| WO | WO-2011077014 A1 * | 6/2011 | | E01F 9/0165 |
| WO | WO-2014007452 A1 * | 1/2014 | | F21S 13/10 |

OTHER PUBLICATIONS

Yun Choruju, "Pedestrian Protection Device", Jul. 24, 2008, JP 2009032260 A, pp. 1/17-7/17 for English text and 16/17-17/17 for Figures 1-7. (Year: 2008).*

P. Boulanger et al., "Using A Thermal Imaging Avenue Of Intelligent Monitoring System And Method", Jul. 16, 2014, Image document "CN 103931172 A" pp. 1-47 merged with English translation text of Abstract, Specification, and Claims. (Year: 2014).*

* cited by examiner

210

210

ILLUMINATION SYSTEM FOR CROSSING ZONE

CROSS REFERENCE

This application claims the benefit of U.S. Provisional Patent Application No. 63/047,288, filed Jul. 2, 2020, which is incorporated herein by reference in its entirety.

TECHNICAL FIELD

The disclosure generally relates to illumination systems for traffic intersections, and more particularly, to a system for illumination of the intersection pedestrian crosswalks within a traffic intersection configuration which has span wires directly above the crosswalk.

BACKGROUND

Traffic lights, and particularly fixtures situated on cables spanning intersections, are designed to assist vehicles navigating an intersection and mainly serve to signal or guide vehicular traffic away from other vehicles and landmark features as well as pedestrians. Current light systems can be mounted on poles or masts as well as cables that span intersections. Various types of fixtures can provide light to pedestrian crosswalks as well as illuminating the intersection for vehicle guidance.

BRIEF DESCRIPTION

Aspects and advantages of the disclosure will be set forth in part in the following description, or may be obvious from the description, or may be learned through practice of the disclosure herein.

In one aspect, the disclosure relates to an illumination system for an intersection, comprising an array of at least one fixture per traffic approach direction securably mounted to the lower span wire directly above the crossing zone configured to provide an overlapping light pattern within the entire crossing zone, at least one sensor, a controller, a timing system and a power source.

In another aspect, the disclosure relates to a method of illuminating a crosswalk. The controller of a crossing zone illumination system receives data from a sensor or a traffic signal controller and controls the level of illumination provided by the array of LED lights based on the output data of the sensor or the status of the traffic signal.

In another aspect, the disclosure relates to a crossing zone illumination system, configured to be positioned above a pedestrian crossing zone for a traffic intersection, comprising at least one housing, each containing an illumination device connectable to a power source, a controller adapted to be connected to each illumination device for adjusting at least one lighting property of the illuminator in response to a received signal, wherein each illumination device, when mounted above a pedestrian crossing zone, directs light toward the pedestrian crossing zone to provide a preselected minimum level of illumination.

These and other features, aspects and advantages of the disclosure will become better understood with reference to the following description. The accompanying drawings, which are incorporated in and constitute a part of this specification, illustrate the disclosure and, together with the description, serve to explain the principles of the disclosure herein.

BRIEF DESCRIPTION OF THE DRAWINGS

A full and enabling disclosure, including the best mode thereof, directed to one of ordinary skill in the art, is set forth in the specification, which makes reference to the appended figures in which.

DETAILED DESCRIPTION

Figure 1:
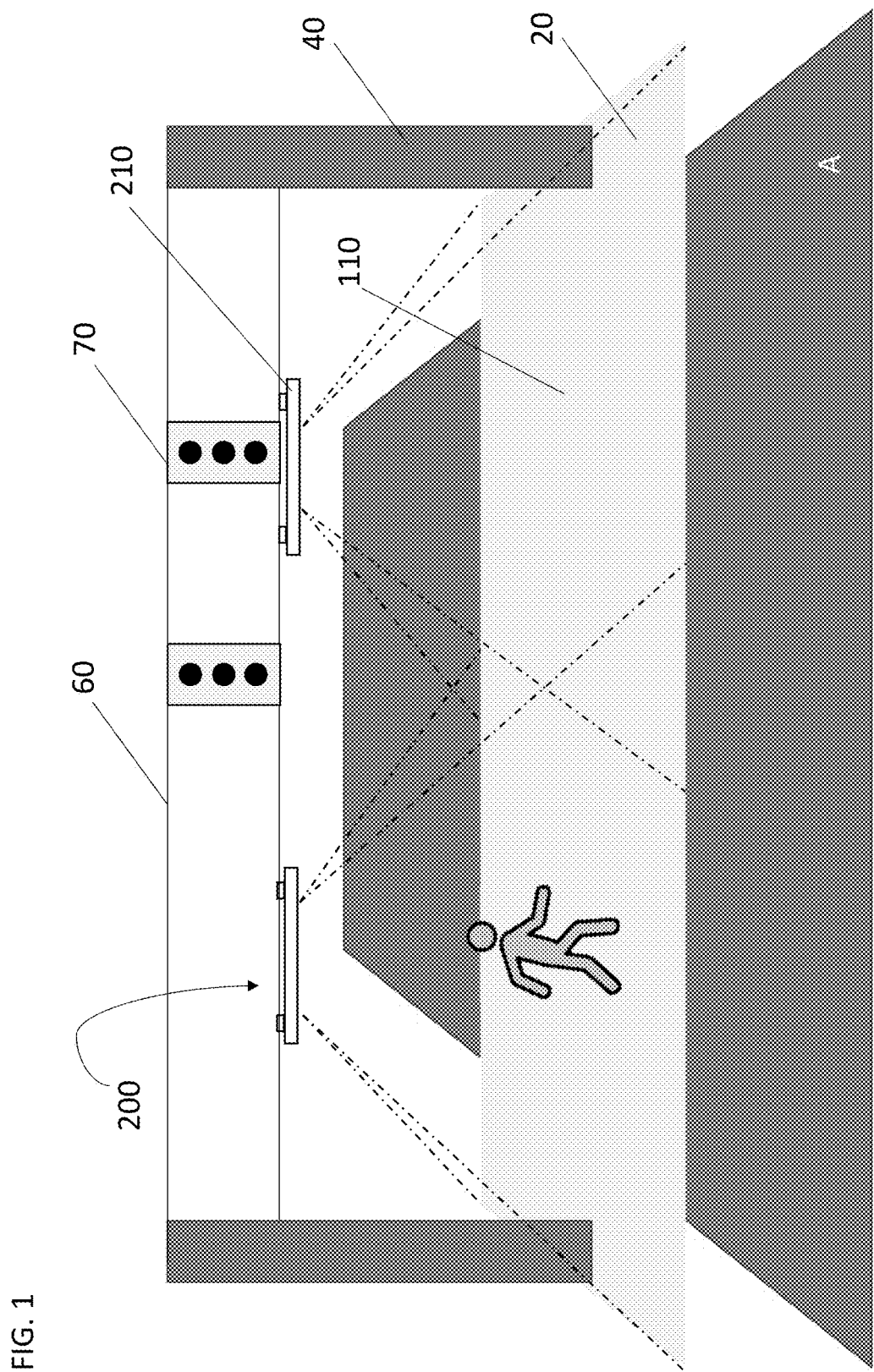
FIG. 1 is a driver's perspective view showing the downlight illumination of a pedestrian in the crosswalk and sidewalk area.

Aspects of the disclosure described herein are broadly directed to illumination systems for traffic intersections, and more particularly, to a system for illumination of the pedestrian crossing zone within a traffic intersection that are configured to be used in connection with LED traffic signals in a box span configuration. For example, the disclosure can have applicability for a crossing zone illumination system at a traffic intersection, and may be used to provide benefits in industrial, commercial, and residential applications.

Additionally, as used herein, the terms "radial" or "radially" refer to a direction away from a common center. Furthermore, as used herein, the term "set" or a "set" of elements can be any number of elements, including only one.

Additionally, as used herein, a "controller" or "controller module" can include a component configured or adapted to provide instruction, control, operation, or any form of communication for operable components to effect the operation thereof. A controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, transponding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient, volatile or non-transient, or non-volatile memory. Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to effect a functional or operable outcome, as described herein.

Additionally, as used herein, elements being "electrically connected," "electrically coupled," or "in signal communication" can include an electric transmission or signal being sent, received, or communicated to or from such connected or coupled elements or equipment in interconnected intersections. Furthermore, such electrical connections or couplings can include a wired or wireless connection, or a combination thereof. Also, as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor as defined above, and the controller module or processor can perform processing on the value to determine a representative value or an electrical characteristic representative of said value.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting on an embodiment, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

As illustrated in FIG. 1, a first road A can include a crosswalk 110, an area of the road A used for alternating vehicle and pedestrian traffic. An area 20 adjacent to the road A can be designated for pedestrian use only. Further adjacent to the road A can be a pair of poles 40. At least one cable 60 can be secured to the poles 40 and overhang an area of the road A.

A crossing zone illumination system 200 is suspended from the cable 60 over road A. An array of lights 210 is included in the crossing zone illumination system 200. The crossing zone illumination system 200 includes at least one array of lights 210. For example, as illustrated in FIG. 1, the crossing zone illumination system 200 can include two arrays of lights 210. The array of lights 210 can be directed towards and can illuminate the crosswalk 110 as well as the area 20. Further, the array of lights 210 can be suspended adjacent to a signal 70 and can be operably coupled with the signal 70. The array of lights 210 can share a power supply with the signal 70 or can receive its power from a separate connection. It will be understood that the power supply can be any form currently known in the art, including but not limited to, direct hard-wired to infrastructure power, solar power, fuel cells, or rechargeable battery.

Figure 2:
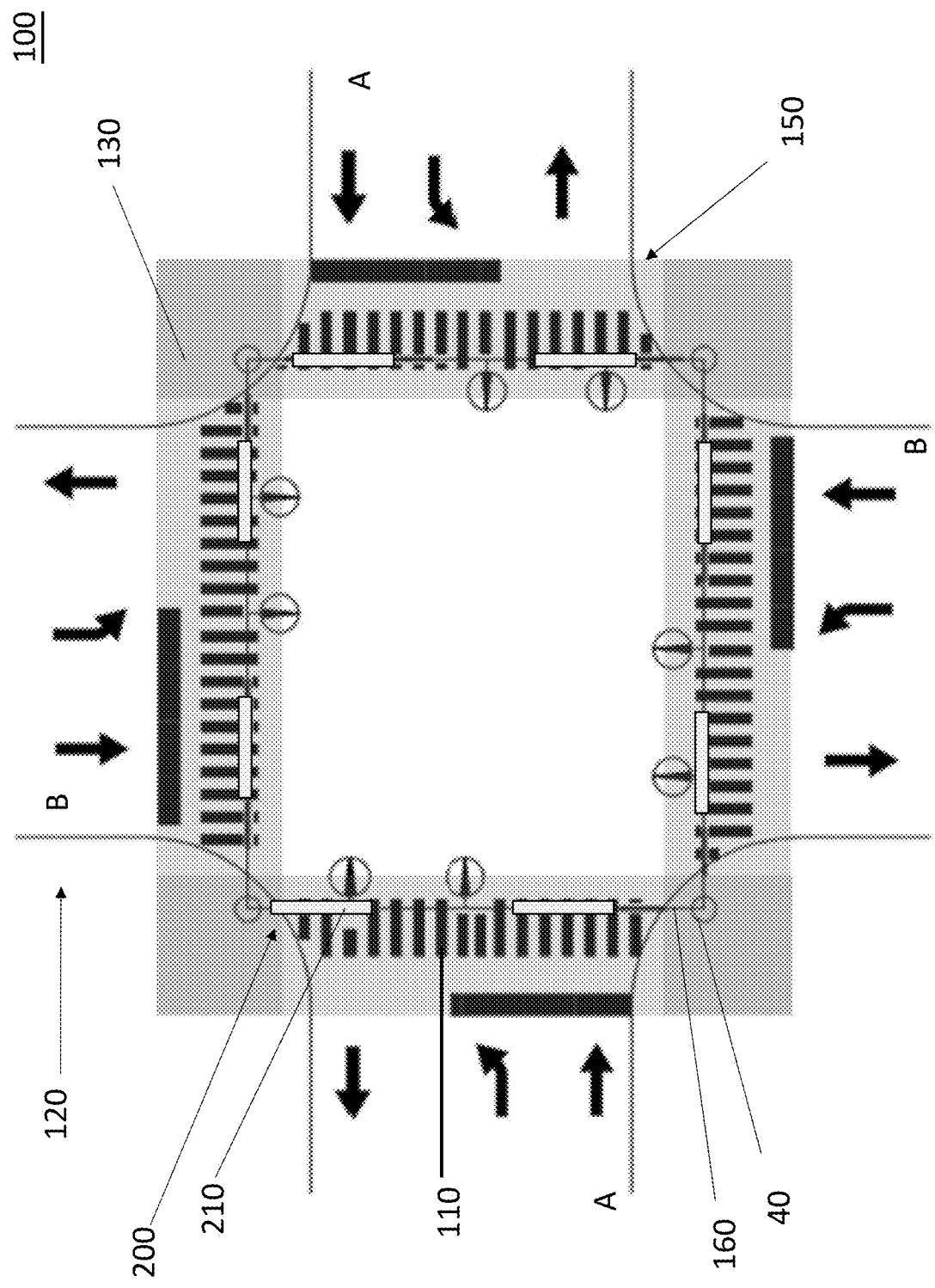
FIG. 2 is a schematic diagram illustrating a traffic intersection showing the placement of the crossing zone illumination system and the illuminated zones.

Referring now to FIG. 2, an intersection 100 can be formed by the first road A and a second road B. The first and second roads A, B are defined as areas reserved for vehicular traffic and the direction of traffic is indicated by arrows. The intersection 100 includes crosswalks 110 that extend across each road at the intersection. Crosswalks 110 are defined as portions of the roads A and B that are for alternating pedestrian/vehicle traffic. Alongside each of road A and road B are pedestrian sidewalks 120. Each corner of the intersection 100 includes a pedestrian waiting area 130 that is part of the area 20 or the sidewalk 120 immediately adjacent the crosswalk 110 and is not part of the vehicle traffic areas of road A or Road B. This area is where pedestrians typically stand while waiting to cross. A crossing zone 150 includes two regions, the crosswalks 110 and the waiting areas 130. Although a crosswalk 110 is illustrated herein at an intersection of roads A and B, it will be understood that the crosswalk 110 should be broadly construed as any pedestrian crossing of a road where vehicles travel, including but not limited to motorized vehicles, and whether or not the crosswalk extends across a road at an intersection or any other intervening crosswalk position.

Poles 40 support span wires 160 that extend across each portion of road A and road B that form the intersection. The traffic signal lights 170 (not shown) are suspended from the span wires 160. While a conventional box span arrangement is illustrated, any form or shape of span arrangement can be utilized, preferably located vertically above so that the crosswalk 110 can be illuminated according to the invention described herein.

The crossing zone illumination system 200 is provided at the intersection 100. In the example shown, the crossing zone illumination system 200 is suspended from span wires 160 above the roads A and B though this need not be the case. The crossing zone illumination system 200 can be in approximate overhanging alignment with the crosswalk 110.

Figure 3:
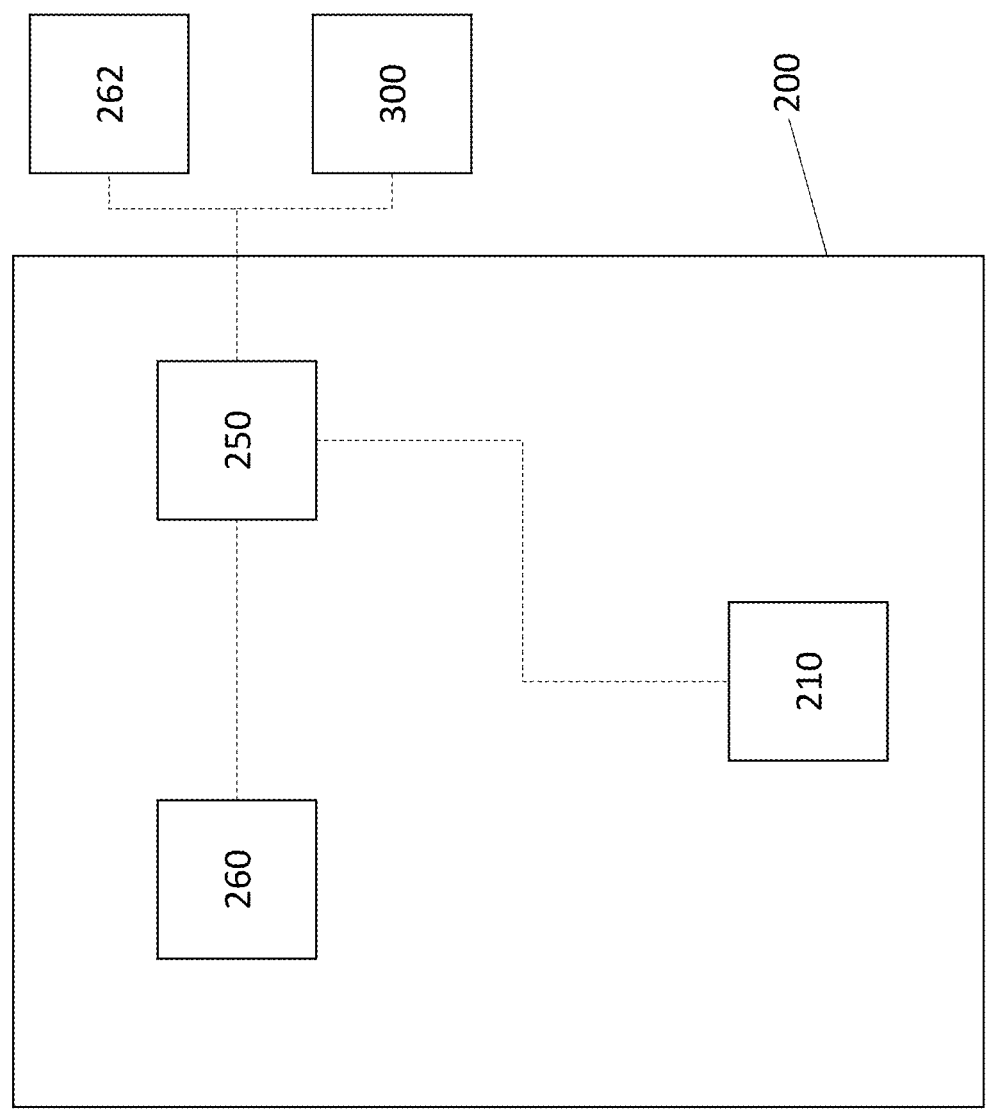
FIG. 3 is a schematic diagram illustrating the crossing zone illumination system of FIG. 1.

Referring now to FIG. 3, and in another aspect of the invention, the crossing zone illumination system 200 can further include a controller 250 and at least one sensor 260 communicatively coupled with the controller 250. The sensor 260 can be of any suitable form including an active sensor, a passive sensor, motion sensor, acoustic sensor, or optical sensor, including visible, infrared, microwave, ultraviolet, or the like, or the sensor 260 can be any of a combination of suitable forms.

It is further contemplated that the controller 250 is in signal communication with an external source, including an external sensor 262 similar to the sensor 260, or a global computer network. The controller 250 can send a signal to or receive a signal from a cloud-based vehicular or traffic management system, including smart traffic lights. Furthermore, a traffic signaling system 300 can also be in signal communication with the controller 250. The traffic signaling system 300 can include any suitable combination of controllers, light sources, timing systems, sensors, and the like as are known for control of traffic lights at the intersection 100 (FIG. 1). The crossing zone illumination system 200 described herein also contemplates that the controller 250, when connected to a global computer network, can make API calls to selected servers with information regarding its condition and/or status, such as its location, pedestrian waiting status, and/or illumination level status, among others, without departing from the scope of this invention. In this manner, the controller 250 can send or receive data from at least one sensor 260 in the crossing zone illumination system 200, at least one external sensor 262, or from the traffic signaling system 300. In this manner, the crossing zone illumination system 200 can be timed with or in conjunction with the traffic signaling system 300.

Figure 4:
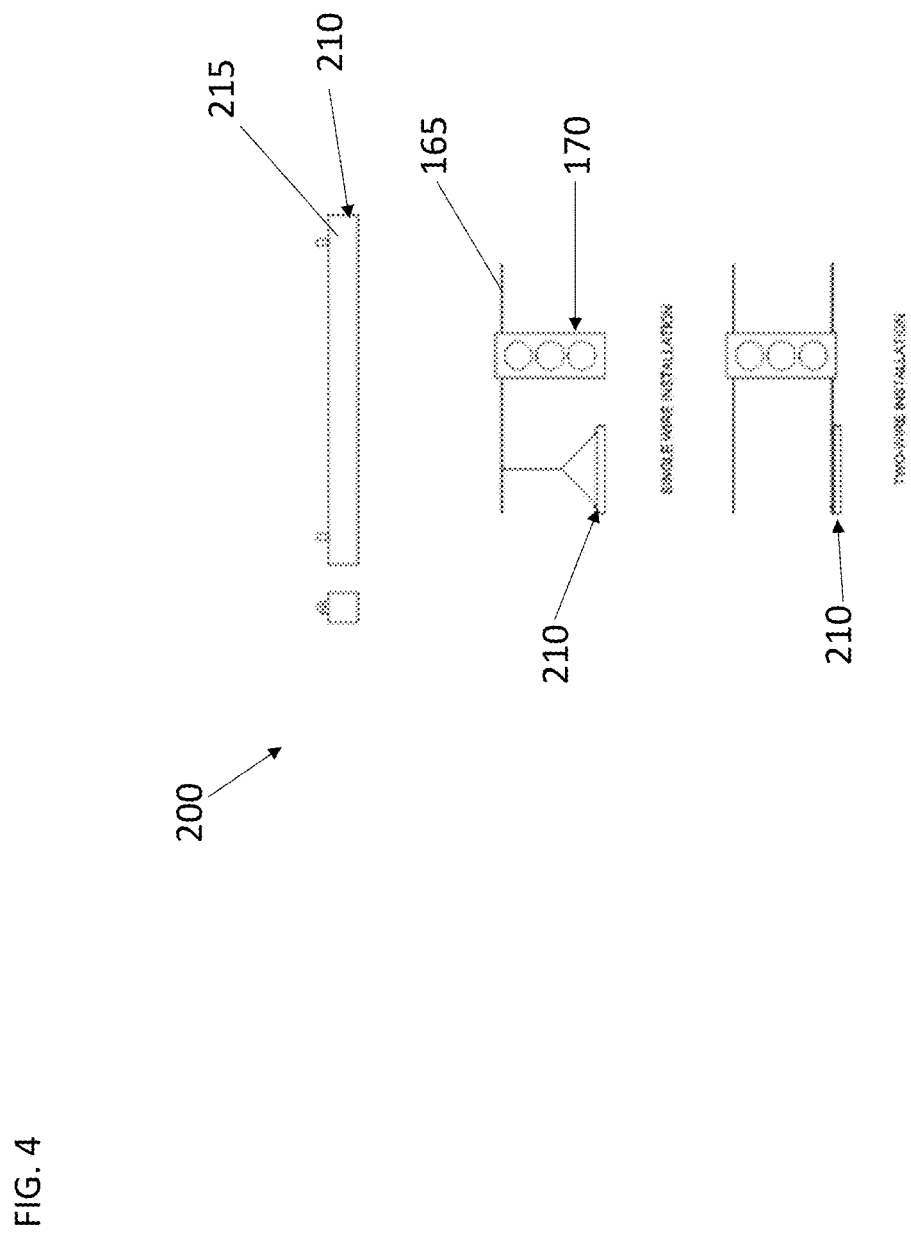
FIG. 4 is a schematic diagram illustrating one- and two-wire suspensions of the crossing zone illumination system of FIG. 1 on a span wire with a traffic signal light.
Figure 5:
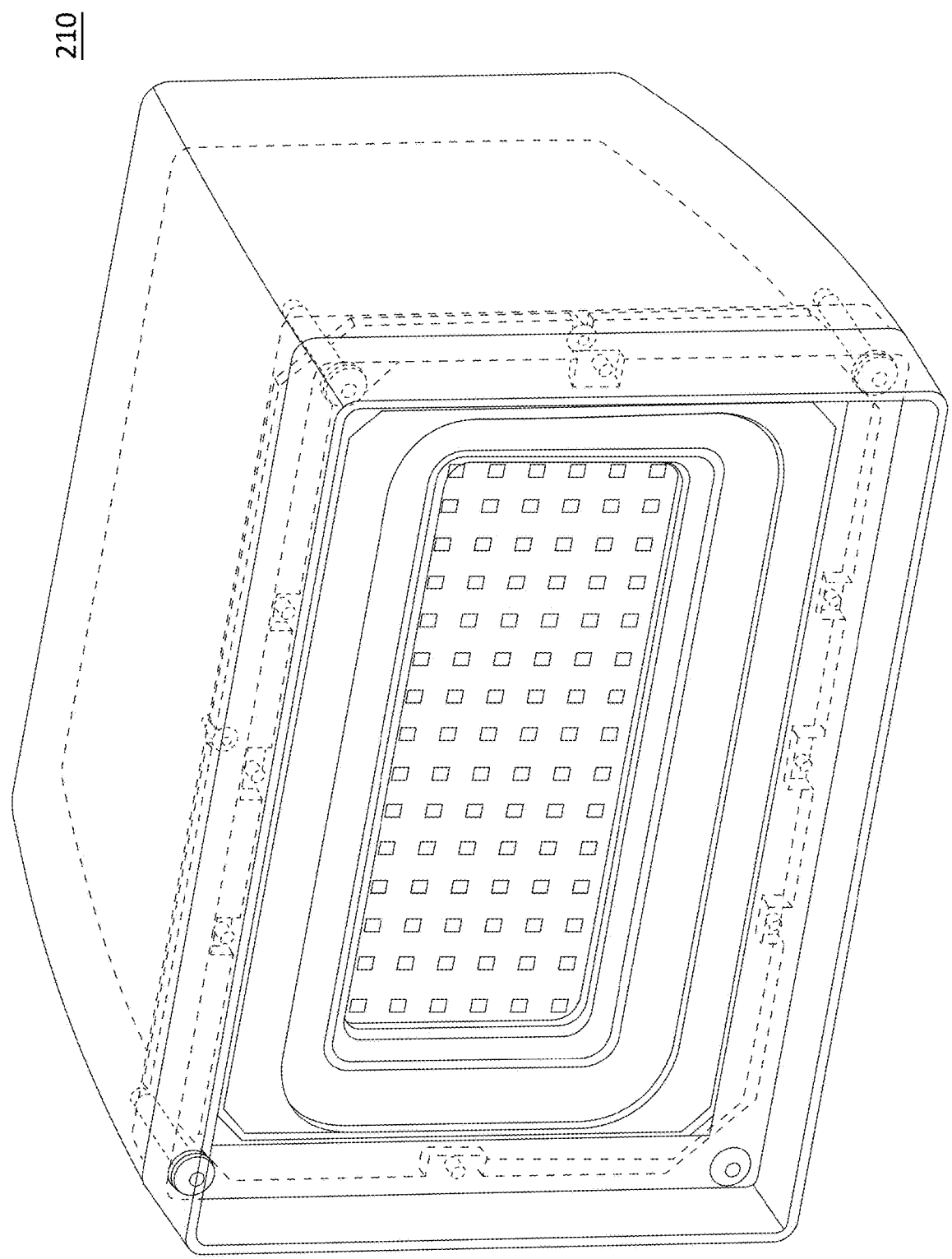
FIG. 5 is a bottom view of an array of lights according to an aspect of the disclosure.
Figure 6:
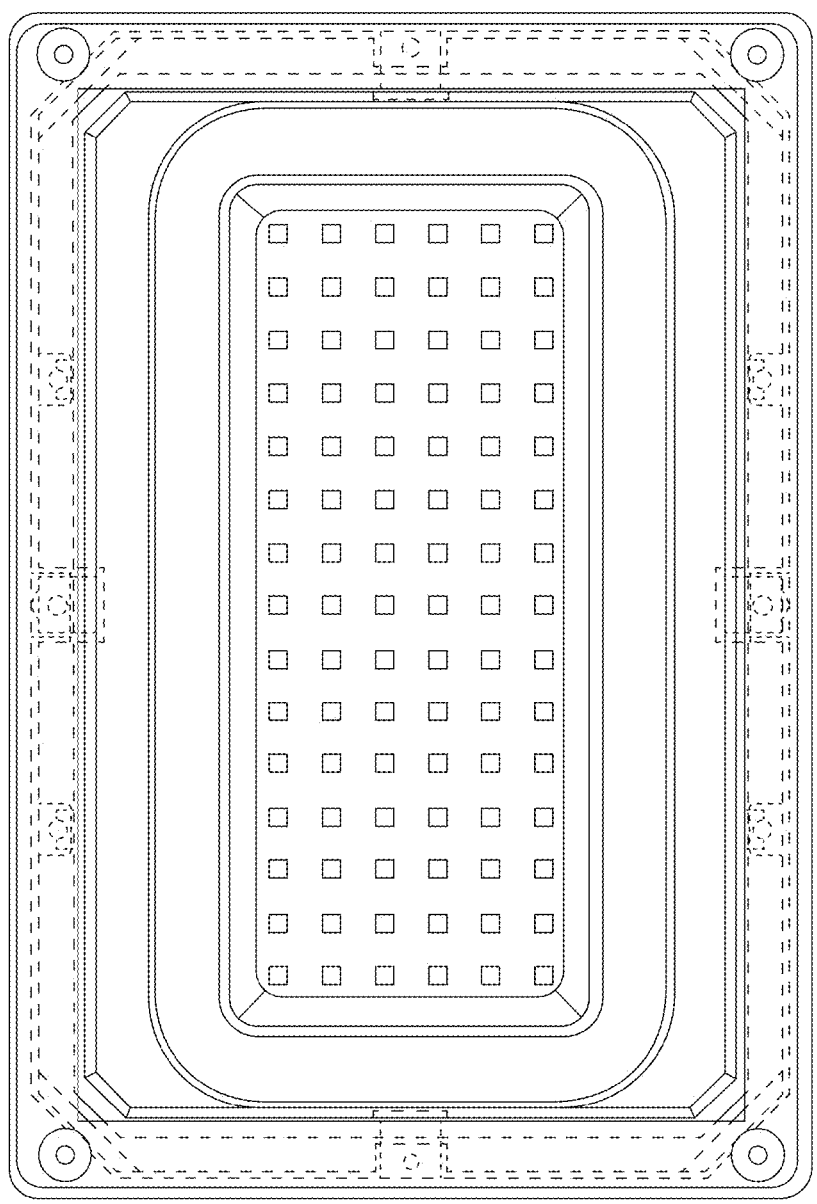
FIG. 6 is an angled, elevated view of the array of lights in FIG. 5.
Figure 7:
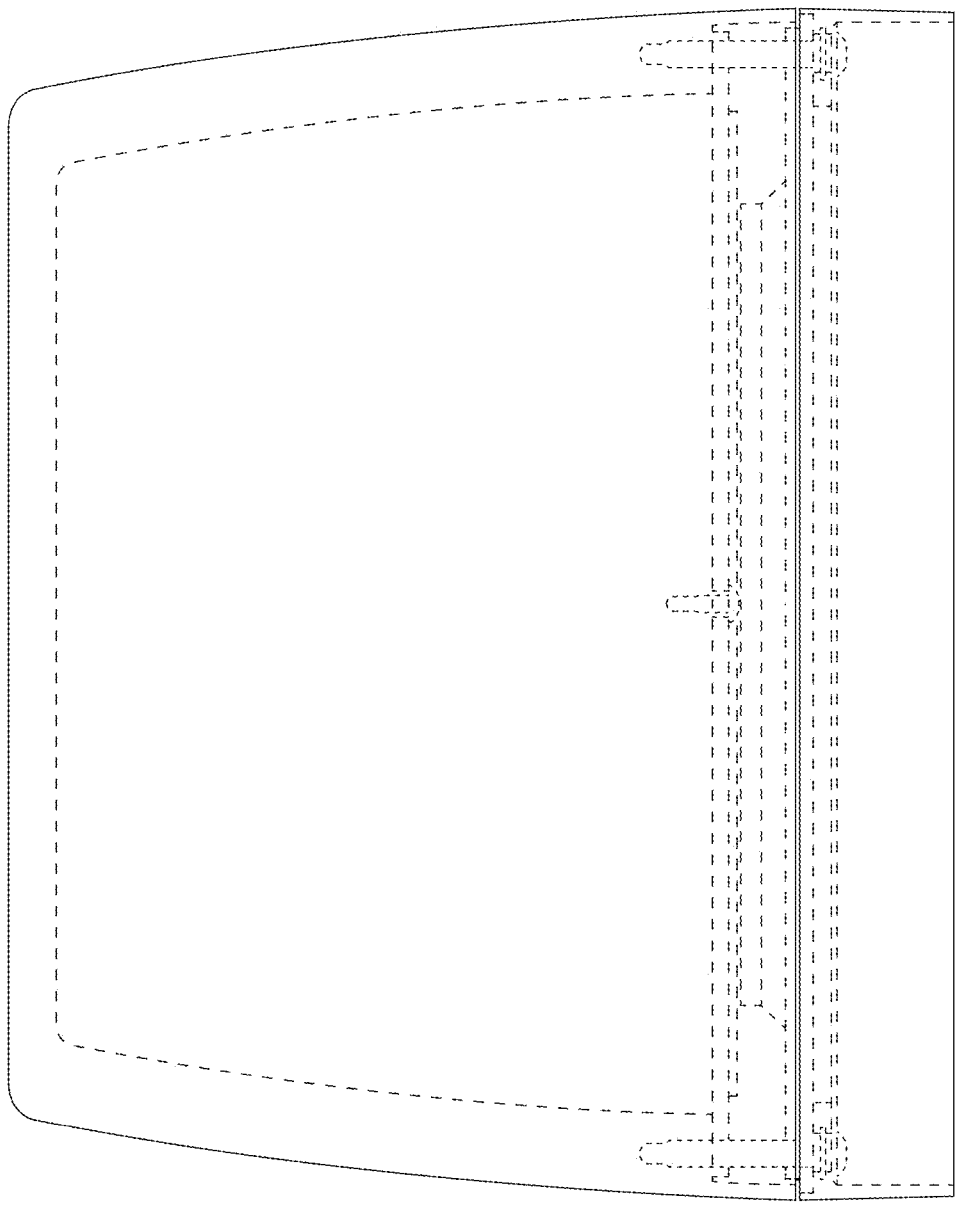
FIG. 7 is a side view of the array of lights in FIG. 5.
Figure 8:
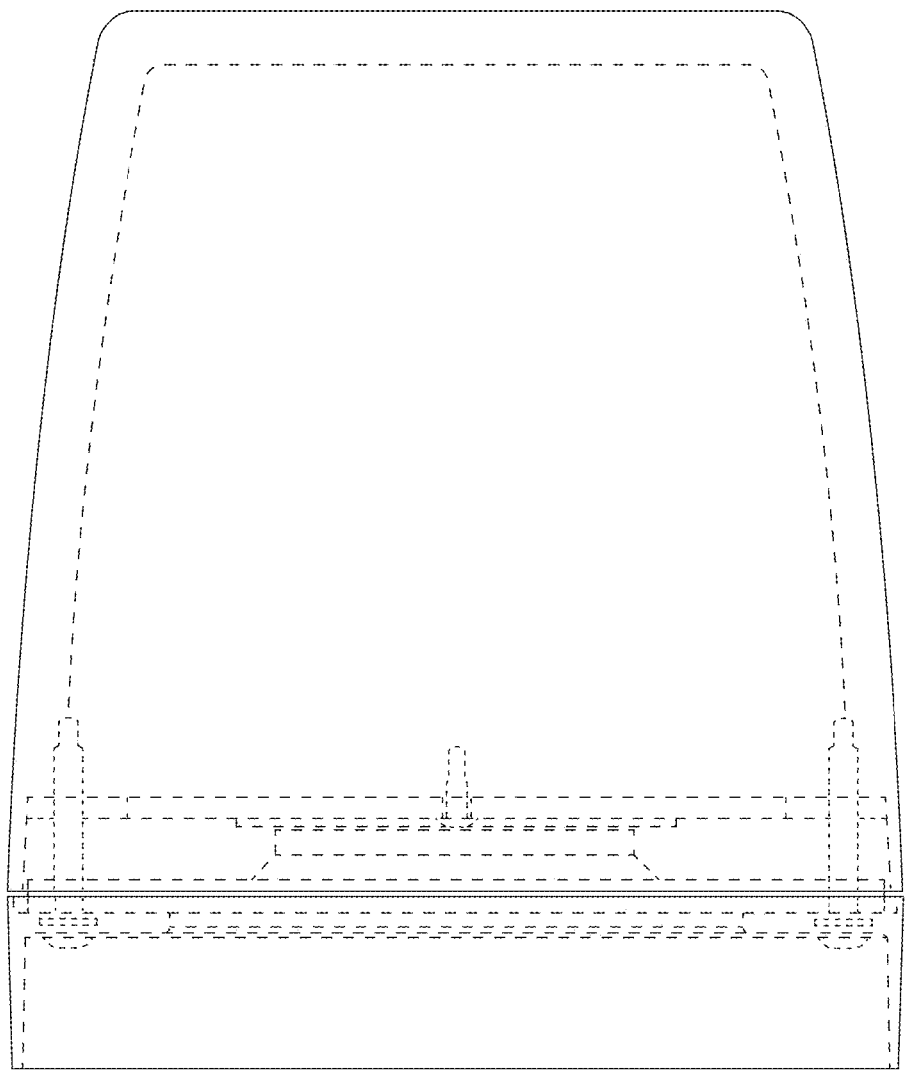
FIG. 8 is another side view of the array of lights in FIG. 5.

Turning to FIG. 4, the crossing zone illumination system 200 can include a single light or an array of lights 210. The array of lights 210 can include lights of any suitable shape, including tubular or round, and also of any suitable form including incandescent, fluorescent, light-emitting diode (LED), or the like, or combinations thereof. The array of lights 210 includes a housing 215 that can be used to suspend the array of lights 210 from the span wire 160. Non-limiting examples are illustrated in FIG. 4 which shows a tubular array of lights 210 suspended by either a single-wire installation or a two-wire installation juxtaposed adjacent to a traffic signal light. The array of lights 210 can be suspended over a corresponding crosswalk 110 and oriented parallel to the direction of the crosswalk 110. Thus, the array of lights 210 can provide overlapping illumination of all areas of the crossing zone 150, including the pedestrian waiting areas 130 and the crosswalk 110. The array of lights 210 can be suspended from the span wire 160 by any suitable means known in the art without departing from the scope of the invention. One possible form of the array of lights 210 is shown in FIGS. 5-8. An example of the power, brightness, and other specifications for suitable lights for the array of lights 210 is shown in Table 1.

TABLE 1

| Optical: | |
| --- | --- |
| LED Quantity: | Floodlight; Wide (NEMA 7 × 7) |
| CRI: | 80 |
| Color Temperature | 3,000K or 4,000K |
| Minimum Luminous flux: | 2500 Lumens |
| Floodlight Luminous flux: | 5000 Lumens |
| Footcandle Readings: | 1.8 -3.4 fc at 20 ft per MUTCD standard for crosswalks |
| Required Candela: | 720-360 |
| Pattern: | Spot diameter 16.7 ft |
| Detection: | |
| Specified Detection: | 5 m |
| Field of View: | 106° × 97° |
| Detection Zones: | 64 |
| Electrical: | |
| Power Supply: | UNV-Universal (120 V-277 V) |
| Power Consumption: | 43 Watts |
| Expected Lifetime: | 10 years |
| Mechanical: | |
| Material: | Light metal alloy housing |
| Dimensions: | 6.5" × 10" × 6" without connection 6.5" × 10" × [13]" with spanwire hanger connection |
| Weight: | 10 lbs |

With reference to FIGS. 1-3, some examples of operation of the crossing zone illumination system 200 will be described below. It should be understood that such examples are given by way of illustration and are not meant to be limiting.

In one example of operation, the controller 250 can control the level of illumination or intensity of light provided by the array of lights 210 based on the received data. For example, the sensor 260 can be a motion sensor that detects the presence of mobile objects within the crossing zone. 150. Additionally, or alternatively, the sensor 260 can detect changes in ambient light and the controller 250 can adjust the level of illumination accordingly, for example the illumination can be changed, such as increased during weather changes such as the event of rain, fog, or snow, or the occurrence of astronomical events, such as full moon or eclipse. Additionally, or alternatively, the sensor 260 can emit an output signal to an autonomous vehicle or to the controller 250 to provide a pedestrian crossing phase for that crosswalk. During times of low pedestrian traffic and low motor traffic levels, the controller 250 can decrease the illumination to save energy.

In another example, the controller 250 can illuminate the crosswalks 110 according to the phase of traffic set by the traffic signaling system 300. For example, in the case the traffic signaling system 300 presents a STOP signal such that the vehicular traffic in street A is stopped, the crossing zone illumination system 200 can selectively illuminate the crosswalks 110 of road A and darken the crosswalks 110 of road B. More specifically, in the case when the turn arrow signals of the traffic signaling system 300 are activated, the crossing zone illumination system 200 can increase the level of illumination so that any pedestrians in the crosswalk can be well recognized by drivers of vehicles or by the pedestrian recognition systems of autonomous vehicles that are turning from road A to road B.

In yet another example, the crossing zone illumination system 200 can further include a timing system and warning lights to illuminate the crosswalks 110 according to conditions set by the time of day and time of year. For example, for intersections in a school zone during an academic season and during hours of darkness, the controller 250 can illuminate the crossing zone 150 and activate the warning lights to further alert drivers to the presence of pedestrians.

In still another example, the crossing zone illumination system 200 can be coordinated with the traffic signaling system 300 and sensor 260 to illuminate the crosswalks according to any combination of unique situations that may arise outside of normal traffic phases. In an example where, vehicular traffic in street A is stopped, and no vehicular traffic is detected in street B, and there are pedestrians present signaling their wishes to use both crosswalks, then all crosswalks 110 for roads A and B can be illuminated.

In yet another example, the controller 250 is in signal communication with a global computer network regarding the level of ambient light at the intersection and the controller can adjust the level of illumination provided to the crosswalks 110 by the array of lights 210 based on the ambient light level. The signal can be, for example, representative of a current time of day including sunset and sunrise times, other astronomical events, or local weather conditions.

Advantageously, the crossing zone illumination system described herein provides dedicated lighting of pedestrian cross walks. The interaction between vehicles and pedestrians within an intersection can be complicated, especially at night when both pedestrian and vehicle driver must rely on various levels of artificial lighting. Current lighting systems, typically comprised of 1 or 2 fixtures, provide a non-uniform level of lighting throughout the intersection and can only indirectly illuminate the crosswalks with diffuse light. Adequate light for drivers to detect pedestrians within crosswalks decreases the risk of driver error, and can assist autonomous vehicles to discern precise locations of pedestrians. The new, box span configuration for intersection lighting provides the infrastructure for lights in optimal positions to illuminate crosswalks and sidewalk areas.

Another benefit of the disclosed system includes complete illumination of a crossing zone that includes pedestrian zones outside the road. The system described herein fully illuminates a pedestrian area from one side of the intersection to the other, including parts of the sidewalk, thus providing continuous illumination of the pedestrian waiting areas around the corners of the intersection, regardless of which crosswalk is illuminated. A further benefit of the disclosed illumination system is that the system can readily be retrofitted or added to existing signal light systems without requiring new installations and can be integrated with existing or new installations of traffic signalling systems to operate within normal traffic phases. The crossing zone illumination system can balance the weight of existing traffic signal lights and share a power supply, reducing the potential for weather-related disruptions. Furthermore, the crossing zone illumination system can utilize controllers and sensor data to increase or decrease illumination of pedestrian crosswalks according to a programmed schedule or on-demand in unusual situations. As self-driving cars become more common, illumination of pedestrians in shared pedestrian-vehicle spaces is critical for the car systems to be able to properly recognize pedestrians and patterns of pedestrian traffic, such as high or low volume of pedestrians in the street.

To the extent not already described, the different features and structures of the various aspects can be used in combination, or in substitution with each other as desired. That one feature is not illustrated in all of the examples is not meant to be construed that it cannot be so illustrated but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods.

What is claimed is:

1. A crossing zone illumination system provided on an intersection including a first road, a second road intersecting the first road, a first crosswalk extending across the first road, a second cross walk extending across the second road, a first pedestrian waiting area being provided between the first cross walk and the second cross walk, a first traffic light controlling traffic from the first road and into the intersection and a second traffic light controlling traffic from the second road and into the intersection, the crossing zone illumination system comprising:
   a first housing including:
      a first illumination device configured to illuminate at least a portion of the first pedestrian waiting area and at least a portion of the first cross walk; and
      and a first passive sensor used to gather a first pedestrian data concerning a presence of a pedestrian within or approaching the first pedestrian waiting area and the first cross walk; and
   a second housing including:
      a second illumination device configured to illuminate at least a portion of the first pedestrian waiting area and at least a portion of the second cross walk; and
      a second passive sensor used to gather a second pedestrian data concerning a presence of a pedestrian within or approaching the first pedestrian waiting area and the second cross walk; and
   a controller provided within at least one of or operably coupled to the first housing and the second housing, the controller configured to:
      receive the first pedestrian data and the second pedestrian data from the first passive sensor and the second passive sensor, respectively;
      communicate the first pedestrian data and the second pedestrian data with a vehicle approaching the intersection along the second road;
      illuminate, to a first illumination value and by the first illumination device, the first cross walk; and
      illuminate, to a second illumination value that is less than the first illumination value and by the second illumination device, the second cross walk when the first illumination device is illuminated to the first illumination value.

2. The crossing zone illumination system of claim 1, wherein the controller is in signal communication with a global computer network.

3. The crossing zone illumination system of claim 2, wherein a signal received from the global computer network is representative of a level of available light and adjusts the illumination to the pedestrian waiting area, the first cross walk and the second cross walk in response to the received signal.

4. The crossing zone illumination system of claim 2, wherein the controller receives a signal representative of a detected weather condition in an area of the intersection and adjusts a level of illumination to the pedestrian waiting area, the first cross walk and the second cross walk based upon the detected weather condition.

5. The crossing zone illumination system of claim 2, wherein a signal received from the global computer network is representative of a school phase in an area of the intersection and provides a caution signal or adjusts a level of illumination to the pedestrian waiting area, the first cross walk and the second cross walk based upon the school phase.

6. The crossing zone illumination system of claim 2, wherein a signal received from the global computer network is representative of a traffic level in an area of the intersection and adjusts a level of illumination to the first cross walk, the second cross walk and the pedestrian waiting area based upon the traffic level.

7. The crossing zone illumination system of claim 2, wherein a signal received from the global computer network signal is representative of a current time of day, a signal representative of daily sunrise and sunset times, and adjusts a level of illumination to pedestrian waiting area, the first cross walk and the second cross walk based upon proximity of a current time of day signal to a daily sunrise or sunset time.

8. The crossing zone illumination system of claim 1, wherein the first housing and the second housing are each mounted to a respective span wire positioned above the first cross walk and the second cross walk, respectively.

9. The crossing zone illumination system of claim 1, wherein the pedestrian waiting area is continuously provided with illumination from at least one of the first illumination device or the second illumination device at an illumination value greater than zero.

10. The crossing zone illumination system of claim 1, wherein the first passive sensor is provided within or along the first housing.

11. The crossing zone illumination system of claim 1, wherein the controller is selectively communicatively couplable with a vehicle approaching the pedestrian crossing zone.

12. The crossing zone illumination system of claim 1, wherein the controller is configured to:
   determine, via a communication with the vehicle, if the vehicle has an intention to turn onto the second road, through the first cross walk; and
   illuminate, to the first illumination value and by the first illumination device, the first cross walk when it is determined that the vehicle has an intention to turn onto the second road.

13. The crossing zone illumination system of claim 12, wherein the controller is configured to indicate, through the illumination of the first cross walk, to the vehicle or a driver of the vehicle that should proceed with caution through the first cross walk.

14. The crossing zone illumination system of claim 12, wherein the controller is further configured to provide a warning, in the form of a direct communication, to the vehicle.

15. The crossing zone illumination system of claim 12, wherein the second illumination value is greater than zero illumination.

16. The crossing zone illumination system of claim 1, wherein the intersection includes a second first pedestrian waiting area provided opposite the first pedestrian waiting area along the first cross walk and a third pedestrian waiting area provided opposite the first pedestrian waiting area along the second cross walk.

17. The crossing zone illumination system of claim 16, wherein:
   the first passive sensor is further configured to gather a third pedestrian data concerning a presence of a pedestrian within or approaching the third pedestrian waiting area and the first cross walk;
   the second passive sensor is further configured to gather a fourth pedestrian data concerning a presence of a pedestrian within or approaching the fourth pedestrian waiting area and the second cross walk; and
   the controller is further configured to:
      receive the first pedestrian data and the third pedestrian data from the first passive sensor; and
      receive the second pedestrian data and the fourth pedestrian data from the second passive sensor.

18. A method of illuminating at least a portion of an intersection, the intersection including:
   a first road, a second road intersecting the first road, a first crosswalk extending across the first road, a second cross walk extending across the second road, a first pedestrian waiting area being provided between the first cross walk and the second cross walk, a first traffic light controlling traffic from the first road and into the intersection, a second traffic light controlling traffic from the second road and into the intersection; and
   an illumination system comprising a first housing including a first illumination device configured to illuminate at least a portion of the first pedestrian waiting area and at least a portion of the first cross walk, and a first passive sensor, and a second housing including a second illumination device configured to illuminate at least a portion of the first pedestrian waiting area and at least a portion of the second cross walk, and a second passive sensor, the method comprising:
   receiving, at a controller communicatively coupled to the first passive sensor, the first illumination device, the second passive sensor, and the second illumination device, a pedestrian data concerning a presence of a pedestrian within or approaching the first pedestrian waiting area or the first cross walk;
   communicating, via the controller, the pedestrian data with a vehicle approaching the intersection along the second road;
   illuminating, via an instruction from the controller to the first illumination device the first illumination device to a first illumination value, the first cross walk; and
   illuminating, via an instruction from the controller to the second illumination device the second illumination device to a second illumination value, less than the first illumination value, the second cross walk when traffic from the first road is directed into the intersection.

19. The method of claim 18, further comprising:
   determining, via the controller and the communication with the vehicle, if the vehicle has an intention to turn onto the second road, through the first cross walk; and
   illuminating, to the first illumination value and by the first illumination device, the first cross walk when it is determined that the vehicle has an intention to turn onto the second road.

20. The method of claim 18, further comprising indicating, through the illumination of the first cross walk, to the vehicle or a driver of the vehicle that should proceed with caution through the first cross walk.

* * * * *